United States Patent [19]
Blumenthal et al.

[11] Patent Number: 6,024,379
[45] Date of Patent: Feb. 15, 2000

[54] VEHICLE OCCUPANT PROTECTION APPARATUS

[75] Inventors: Jack L. Blumenthal, Los Angeles, Calif.; John P. O'Loughlin, Gilbert; Eric N. Streif, Higley, both of Ariz.

[73] Assignee: TRW Vehicle Safety Systems Inc., Lyndhurst, Ohio

[21] Appl. No.: 08/848,074

[22] Filed: May 1, 1997

[51] Int. Cl.[7] .................................................. B60R 21/26
[52] U.S. Cl. .......................................... 280/737; 280/741
[58] Field of Search ................................... 280/735, 734, 280/736, 741, 742, 737

[56] References Cited

U.S. PATENT DOCUMENTS

| | | |
|---|---|---|
| 3,655,217 | 4/1972 | Johnson . |
| 3,689,105 | 9/1972 | Matsui et al. . |
| 3,966,226 | 6/1976 | Roth . |
| 5,022,674 | 6/1991 | Frantom et al. . |
| 5,348,344 | 9/1994 | Blumenthal et al. . |
| 5,351,989 | 10/1994 | Popek et al. . |
| 5,411,289 | 5/1995 | Smith et al. . |
| 5,413,378 | 5/1995 | Steffens, Jr. et al. . |
| 5,470,104 | 11/1995 | Smith et al. . |
| 5,494,312 | 2/1996 | Rink . |
| 5,527,066 | 6/1996 | Svensson . |
| 5,531,473 | 7/1996 | Rink et al. ............................... 280/737 |
| 5,558,367 | 9/1996 | Cuevas . |
| 5,566,976 | 10/1996 | Cuevas . |
| 5,582,428 | 12/1996 | Buchanan et al. . |
| 5,613,702 | 3/1997 | Goetz ...................................... 280/735 |
| 5,660,803 | 8/1997 | Brede et al. ............................. 422/305 |
| 5,690,357 | 11/1997 | Cuevas .................................... 280/737 |
| 5,779,266 | 7/1998 | Moore et al. ............................ 280/737 |
| 5,836,610 | 11/1998 | Rink et al. ............................... 280/736 |
| 5,863,067 | 1/1999 | Blumenthal et al. .................... 280/741 |

OTHER PUBLICATIONS

Japanese Patent Publication SHO 50(1975)–112939 (with English language translation).
Copending U.S. Patent Application Serial No. 08/606,067, filed Feb. 23, 1996, entitled Apparatus for Inflating an Inflatable Vehicle Occupant Restraint.
Copending U.S. Patent Application Serial No. 08/637,856, filed Apr. 25, 1996, entitled Dual Stage Air Bag Inflator.
Copending U.S. Patent Application Serial No. 08/760,837, filed Dec. 5, 1996, entitled Vehicle Occupant Protection Apparatus.

Primary Examiner—Lanna Mai
Assistant Examiner—Faye M. Fleming
Attorney, Agent, or Firm—Tarolli, Sundheim, Covell, Tummino & Szabo L.L.P.

[57] ABSTRACT

An apparatus for deploying an inflatable vehicle occupant protection device (12) includes a pressure vessel (16) containing inflation fluid, and a source of thermal energy which heats the inflation fluid. An initiator assembly (17), when actuated, initiates an outlet flow of the inflation fluid from the pressure vessel (16). The initiator assembly (17) includes a first actuatable device (18) which varies the degree to which the thermal energy can heat the inflation fluid, and further includes a second actuatable device (20) which causes the source to release the thermal energy to heat the inflation fluid. The initiator assembly (17) is actuated in a selected one of a plurality of differing stages. The differing stages correspond to a plurality of differing deployment conditions, and include a "softest" stage in which only the first actuatable device (18) is actuated.

13 Claims, 3 Drawing Sheets

VEHICLE OCCUPANT PROTECTION APPARATUS

FIELD OF THE INVENTION

The present invention relates to an apparatus for deploying an inflatable vehicle occupant protection device.

BACKGROUND OF THE INVENTION

An inflatable vehicle occupant protection device, such as an air bag, is deployed upon the occurrence of a vehicle crash. The air bag is part of a vehicle occupant protection apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it helps to protect an occupant of the vehicle from a forceful impact with parts of the vehicle as a result of the crash.

The manner in which the air bag affects movement of the vehicle occupant can be influenced by factors such as the force with which the occupant moves against the air bag and the pressure of the inflation fluid in the air bag. Those factors, in turn, can be influenced by vehicle conditions such as the severity of the crash, and/or by vehicle occupant conditions such as the size, weight and position of the occupant.

SUMMARY OF THE INVENTION

The present invention is an apparatus for deploying an inflatable vehicle occupant protection device. In accordance with the present invention, the apparatus comprises a pressure vessel containing inflation fluid, and a source of thermal energy which heats the inflation fluid. An initiator assembly, when actuated, initiates an outlet flow of the inflation fluid from the pressure vessel.

The initiator assembly includes first and second actuatable devices. The first actuatable device varies the degree to which the thermal energy can heat the inflation fluid. The second actuatable device causes the source to release the thermal energy to heat the inflation fluid.

The apparatus further comprises means for actuating the initiator assembly in a selected one of a plurality of differing stages. The differing stages correspond to a plurality of differing deployment conditions, and include a "softest" stage in which only the first actuatable device is actuated.

An apparatus constructed in accordance with the present invention enables the inflation fluid to inflate a vehicle occupant protection device in a manner that is tailored to a particular deployment condition, such as a vehicle or vehicle occupant condition, that exists at the time of a crash. Importantly, actuation of only the first actuatable device in the initiator assembly enables the inflation fluid to exit the pressure vessel without being heated. The inflation fluid then flows from the pressure vessel to the inflatable device at flow rates that are lower than the flow rates that would otherwise result from heating of the inflation fluid. Such relatively low flow rates may be desirable under certain deployment conditions, such as when the vehicle experiences a crash of relatively low severity and/or when the protection device is used to help protect an out of position vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
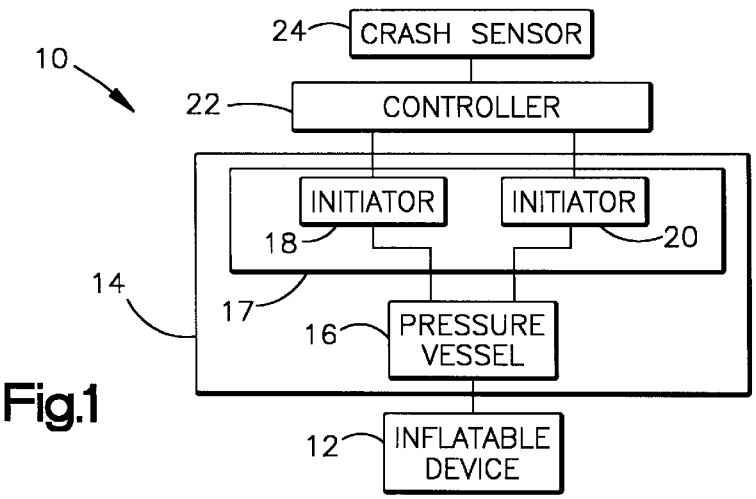
FIG. 1 is a schematic view of a vehicle occupant protection apparatus comprising a first embodiment of the present invention.

A vehicle occupant protection apparatus 10 comprising a first embodiment of the present invention is shown schematically in FIG. 1. The apparatus 10 includes an inflatable vehicle occupant protection device 12. In the first embodiment of the present invention, the protection device 12 is an air bag. Other inflatable vehicle occupant protection devices that can be used in accordance with the present invention include, for example, inflatable seat belts, inflatable knee bolsters, inflatable head liners or side curtains, and knee bolsters operated by inflatable air bags. The apparatus 10 further includes an inflator 14 which comprises a source of inflation fluid for inflating the air bag 12. When the air bag 12 is inflated, it extends into a vehicle occupant compartment (not shown) to help protect a vehicle occupant from a forceful impact with parts of the vehicle as a result of a crash.

The inflator 14 includes a pressure vessel 16 which stores pressurized inflation fluid for inflating the air bag 12. The inflator 14 further includes a source of thermal energy for heating the inflation fluid in the pressure vessel 16. The source of thermal energy preferably comprises ignitable fluid which also is stored in the pressure vessel 16. Specifically, the pressure vessel 16 in the first embodiment of the present invention stores a pressurized, combustible mixture of gases including primary gas and fuel gas. The primary gas comprises the majority of the inflation fluid that inflates the air bag 12. The fuel gas provides heat of combustion which heats the primary gas.

The inflator 14 has an initiator assembly 17 which, when actuated, initiates an outlet flow of the inflation fluid from the pressure vessel 16. The initiator assembly 17 includes first and second initiators 18 and 20 which are actuatable separately from each other. The first initiator 18, when actuated, opens the pressure vessel 16 but does not ignite the fuel gas in the mixture of gases. The second initiator 20, when actuated, ignites the fuel gas. A controller 22 actuates the initiator assembly 17 in response to a deployment signal received from a crash sensor 24.

The mixture of gases may have any suitable composition known in the art, but preferably has a composition in accordance with the invention set forth in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc. Accordingly, the primary gas preferably includes an inert gas for inflating the air bag and an oxidizer gas for supporting combustion of the fuel gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 13% by volume hydrogen and about 87% by volume air. Although the storage pressure may vary, it is preferably within the range of approximately 1,500 psig to approximately 5,000 psig., and is most preferably approximately 3,000 psig.

The crash sensor 24 is a known device which senses a vehicle condition that indicates the occurrence of a crash. If the vehicle condition sensed by the crash sensor 24 is at or above a predetermined threshold level, it indicates the occurrence of a crash having at least a predetermined threshold level of severity. The threshold level of crash severity is a level at which inflation of the air bag 12 is desired for protection of a vehicle occupant. The crash sensor 24 then provides the controller 22 with a deployment signal.

The vehicle condition sensed by the crash sensor 24 preferably comprises sudden vehicle deceleration that is caused by a collision. The magnitude and duration of the deceleration are measured by the crash sensor 24. If the magnitude and duration of the deceleration meet or exceed predetermined threshold levels, they indicate the occurrence of a crash that meets or exceeds the predetermined threshold level of crash severity. A deployment signal is then transmitted to the controller 24 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 12 is to be inflated.

The controller 22, which may comprise a microprocessor of known construction, actuates the initiator assembly 17 by actuating the initiators 18 and 20 individually. The controller 22 preferably actuates the first initiator 18 upon receiving the deployment signal from the crash sensor 24. The controller 22 preferably actuates the second initiator 20 at a time which is determined with reference to the value of the deployment signal received from the crash sensor 24. Actuation of the first and second initiators 18 and 20 is thus timed with reference to both the occurrence and the severity of the crash. As described more fully below, this causes the inflation fluid to flow from the pressure vessel 16 to the air bag 12 at flow rates that are correlated to the severity of the crash so that the air bag 12 is deployed accordingly.

Figure 2:
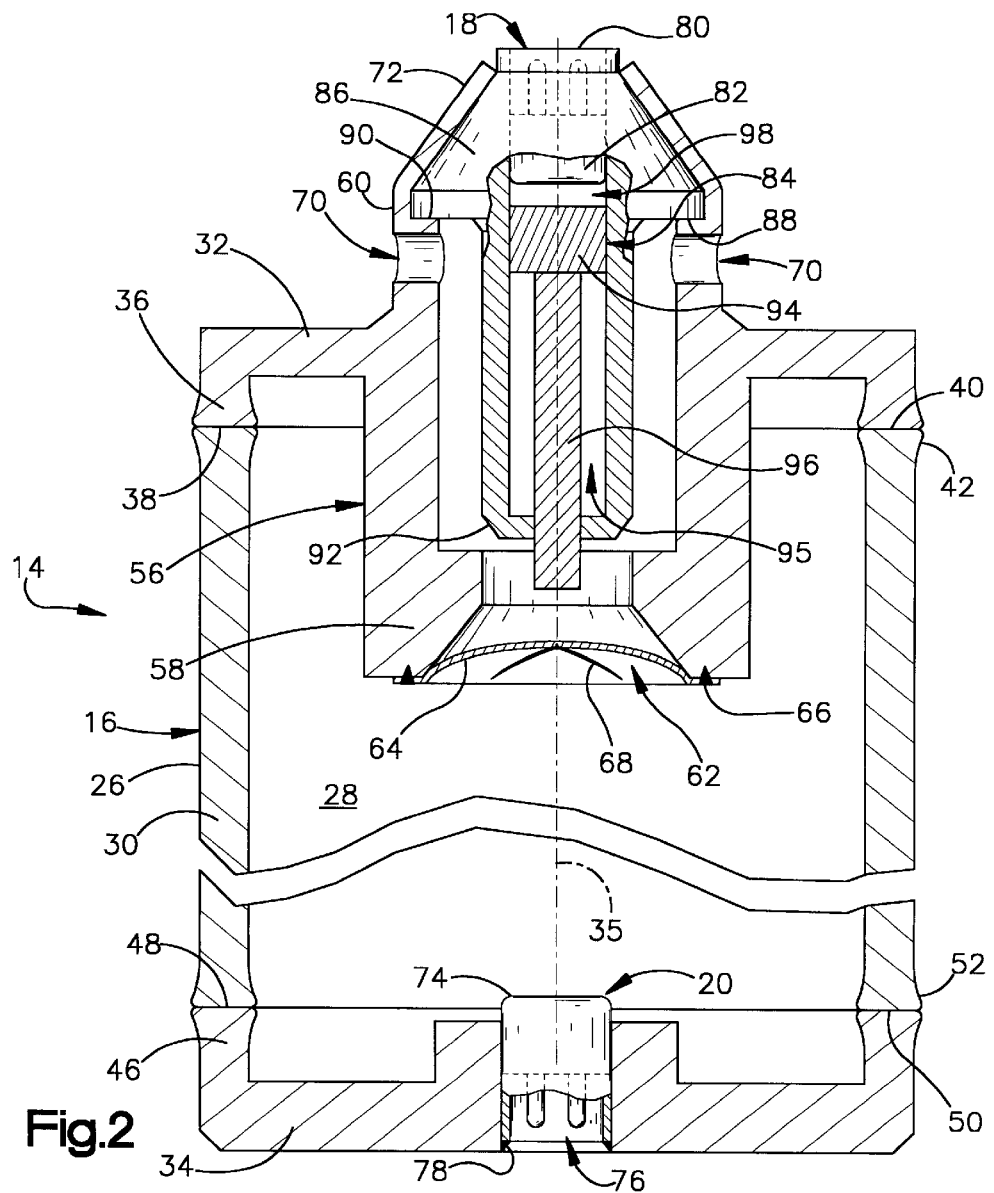
FIG. 2 is a side view, partly in section, of parts of the apparatus of FIG. 1.

The inflator 14 in the first embodiment of the present invention has the structure shown by way of example in FIG. 2. The pressure vessel 16 comprises an elongated cylindrical container 26 defining an elongated cylindrical storage chamber 28. The container 26 has a tubular body wall 30 and a pair of circular opposite end walls 32 and 34, each of which is centered on a longitudinal axis 35.

The first end wall 32 of the container 26 has an axially projecting rim portion 36. An annular end surface 38 of the rim portion 36 abuts an annular end surface 40 of the body wall 30. A first friction weld 42 fixes and seals the first end wall 32 and the body wall 30 together at their abutting end surfaces 38 and 40. The second end wall 34 similarly has an axially projecting rim portion 46 with an annular end surface 48 abutting an annular end surface 50 of the body wall 30. A second friction weld 52 fixes and seals the second end wall 34 and the body wall 30 together at their abutting end surfaces 48 and 50. The container walls 30, 32 and 34 may be formed of steel, aluminum, or any suitable alloy known in the art. The friction welds 42 and 52 preferably are inertia welds. However, other types of friction welds, such as conventional friction welds or flywheel friction welds, can be used as alternatives.

A tubular central section 56 of the first end wall 32 has an inner end portion 58 and an outer end portion 60. The inner end portion 58 defines a circular outlet opening 62 centered on the axis 35. A closure wall in the form of a steel burst disk 64 extends fully across the outlet opening 62, and is fixed and sealed to the tubular wall section 56 by a circumferentially extending weld 66. The burst disk 64 thus closes the storage chamber 28 at the outlet opening 62. A plurality of radially extending score lines 68 delineate petal-shaped sections of the burst disk 64 which separate and deflect outwardly from the storage chamber 28 in a known manner when the burst disk 64 ruptures. Although the first embodiment of the present invention includes a steel burst disk 64 with radially extending score lines 68, any other suitable closure wall structure known in the art, such as, for example, an aluminum pop-off disk with a circumferentially extending score line, could be used as an alternative.

The outer end portion 60 of the tubular wall section 56 has a circumferentially extending array of outlet openings 70 for directing inflation fluid to flow from the inflator 14 toward the air bag 12 (FIG. 1). The outer end portion 60 further has a rim wall 72 which is crimped radially inward against the first initiator 18 to support the first initiator 18 within the tubular wall section 56 in a position centered on the axis 35.

The second initiator 20 preferably is a particular type of electrically actuatable igniter which is known as a squib. The second initiator 20 thus has a cylindrical casing 74 containing a small charge of pyrotechnic material. The casing 74 fits closely within a cylindrical aperture 76 extending axially through the second end wall 34. A TIG weld 78 fixes and seals the casing 74 and the second end wall 34 together so that the second initiator 20 closes the storage chamber 28 at the aperture 76.

As further shown in FIG. 2, the first initiator 18 comprises a housing 80 containing a squib 82 and a piston 84. A frustoconical portion 86 of the housing 80 has an annular shoulder surface 88 abutting an annular shoulder surface 90 of the tubular wall section 56. The crimped rim wall 72 holds the abutting surfaces 88 and 90 together firmly enough to block the passage of inflation fluid outward between the first initiator 18 and the tubular wall section 56.

A cylindrical portion 92 of the housing 80 projects axially from the frustoconical portion 86 toward the burst disk 64. The cylindrical portion 92 of the housing 80 supports the piston 84 for sliding movement along the axis 35. Specifically, a short cylindrical base portion 94 of the piston 84 is closely and slidably received within a central bore 95 in the cylindrical portion 92 of the housing 80. A slender, elongated ram portion 96 of the piston 84 projects longitudinally from the base portion 94 toward the burst disk 64 along the axis 35. A variable volume thrust chamber 98 is defined within the bore 95 between the squib 82 and the base portion 94 of the piston 84.

The squib 82 in the first initiator 18 also contains a small charge of pyrotechnic material. When the first initiator 18 is actuated, the pyrotechnic material in the squib 82 is ignited and produces combustion products which are spewed from the squib 82 into the thrust chamber 98. The combustion products then develop a thrust which acts against the base portion 94 of the piston 84 to propel the piston 84 along the axis 35 so that the ram portion 96 of the piston 84 moves forcefully against and through the burst disk 64. When the burst disk 64 is penetrated in this manner, it ruptures along the score lines 68 under the influence of the fluid pressure in the storage chamber 28. The mixture of gases then begins to flow outward from the storage chamber 28 through the outlet opening 62 and further outward from the inflator 14 through the outlet openings 70.

Importantly, the base portion 94 of the piston 84 blocks the combustion products emitted from the squib 82 from exiting the thrust chamber 98 in the bore 95, and thus blocks the combustion products from entering the storage chamber 28. This ensures that the combustion products do not ignite the fuel gas in the storage chamber 28. Therefore, the mixture of gases begins to flow outward from the storage chamber 28 upon actuation of the first initiator 18, but the temperature and fluid pressure in the storage chamber 28, and hence the flow rate of the gases emerging from the storage chamber 28, are not affected by the combustion products emitted from the squib 82. Moreover, since the squib 82 does not need to provide the energy required to ignite the fuel gas as well as to rupture the burst disk 62, it can contain a correspondingly lesser amount of pyrotechnic material.

When the second initiator 20 is actuated, it spews combustion products directly into the storage chamber 28. Those combustion products ignite the fuel gas and cause corresponding increases in the temperature, pressure and outlet flow rate. Accordingly, these parameters can be controlled in accordance with the present invention by controlling the timing at which the first and second initiators 18 and 20 are actuated.

More specifically, the controller 22 (FIG. 1) actuates the initiator assembly 17 in a selected one of a plurality of differing stages in response to the crash severity indicated by the deployment signal received from the crash sensor 24. The differing stages of actuation include a "softest" stage in which only the first initiator 18 is actuated, and include additional stages in which the second initiator 20 is actuated after the first initiator 18 is actuated. Other stages include a stage in which the first and second initiators 18 and 20 are actuated simultaneously, and stages in which the second initiator 20 is actuated before the first initiator 18.

For example, if the deployment signal indicates that the vehicle is experiencing a crash of a predetermined low severity, the controller 22 may select the softest stage in which only the first initiator 18 is actuated. The unheated mixture of gases will then flow from the inflator 14 to the air bag 12 at relatively low flow rates that are determined by the storage pressure.

If the deployment signal indicates that the vehicle is experiencing a crash of a predetermined intermediate level of severity, the controller 22 may select a stage of actuation in which the first initiator 18 is initially actuated, with the second initiator 20 being subsequently actuated after the lapse of a delay time. Such a delay time is determined by the controller 22 with reference to the intermediate level of crash severity.

The controller 22 may determine the delay time by selecting from a look-up table based on empirically derived values of crash severity. The controller 22 may alternatively determine the delay time as the result of a computation based on a predetermined functional relationship between crash severity and delay time. In any case, the delay time will affect the amounts of fuel gas and primary gas remaining in the storage chamber 28 when the second initiator 20 is actuated. The controller 22 thus causes the initiator assembly 17 to reduce the degree to which the thermal energy of the fuel gas can heat the primary gas by dissipating the fuel gas, and also by decreasing the amount of a primary gas available for heating by the fuel gas, before the second initiator 20 is actuated. This causes corresponding reductions in the increased pressure levels and outlet flow rates that are attainable upon actuation of the second initiator 20.

If the deployment signal indicates the occurrence of a crash having a high level of severity, the controller 22 may select a stage in which the first and second initiators 18 and 20 are actuated simultaneously, i.e., with a delay time of zero. Moreover, if the deployment signal indicates the occurrence of a crash having an even higher level of severity, the controller 22 may select a stage in which the second initiator 20 is initially actuated, with the first initiator 18 being subsequently actuated after the lapse of an appropriate delay time. The fluid pressure in the storage chamber 28 will then increase to a greatly elevated level before the first initiator 18 opens the pressure vessel 16. This will result in maximum outlet flow rates.

Figure 3:
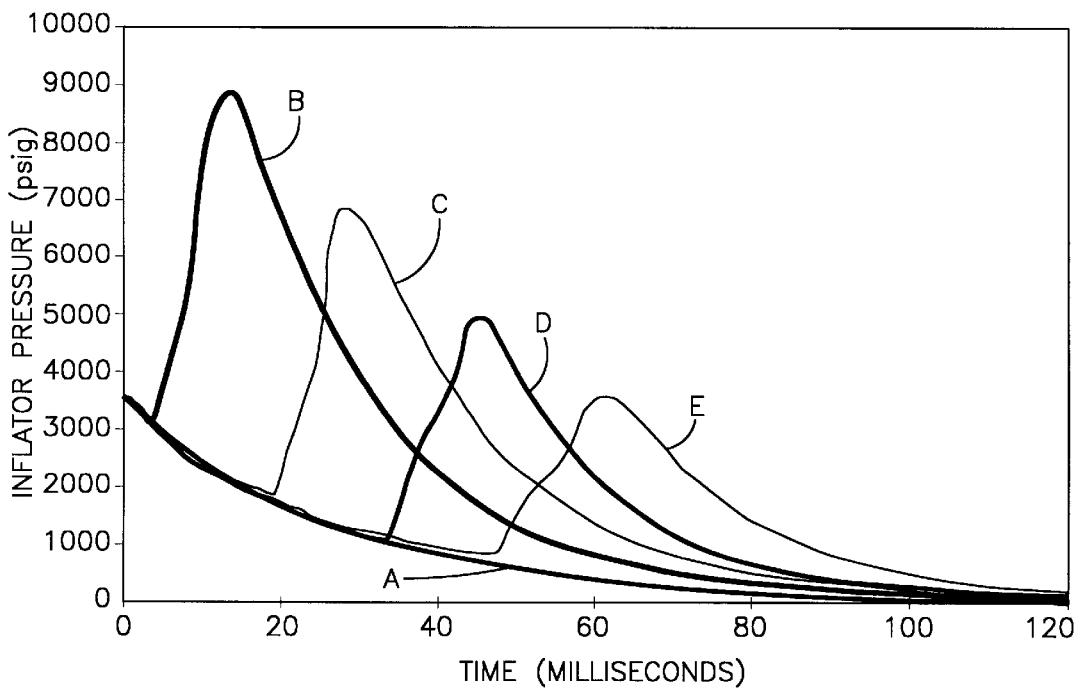
FIGS. 3 and 4 are graphs showing performance characteristics of a test apparatus like the apparatus of FIG. 1.
Figure 4:
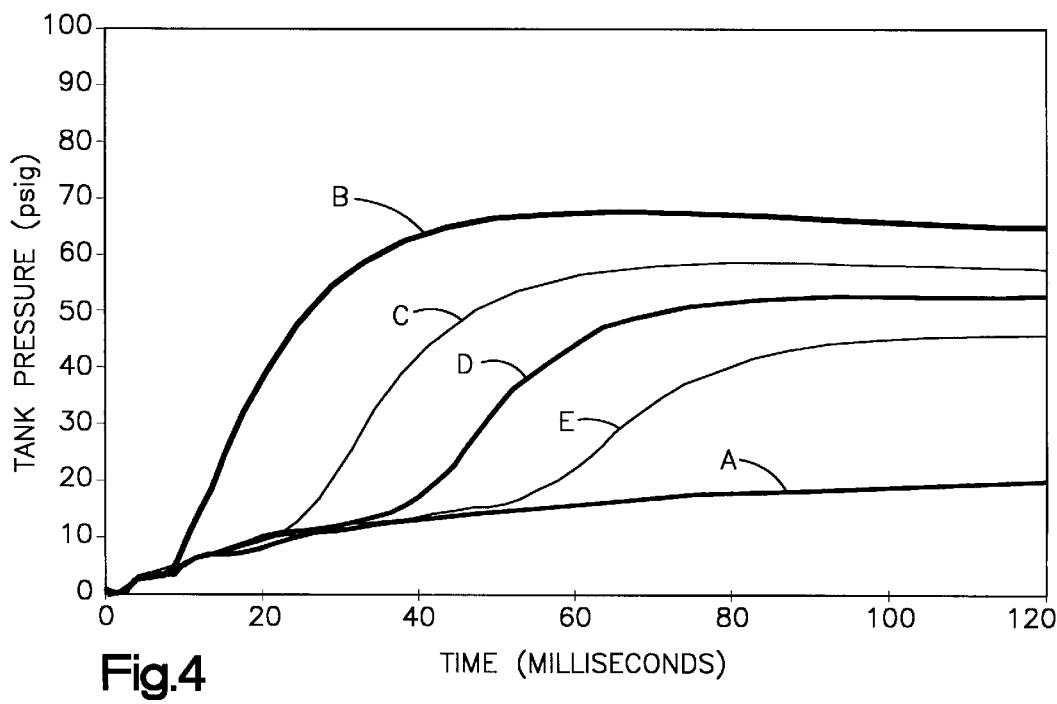

FIGS. 3 and 4 are graphs showing performance characteristics of a test apparatus (not shown) which is substantially similar to the vehicle occupant protection apparatus 10 of FIG. 1. The test apparatus includes a test inflator like the inflator 14. The fluid pressure in the storage chamber of the test inflator is indicated on the vertical axis of FIG. 3. Instead of an inflatable device like the air bag 12, the test apparatus includes a tank in which fluid pressure can be measured. The fluid pressure in the tank is indicated on the vertical axis of FIG. 4. The horizontal axes of FIGS. 3 and 4 have the same time scale.

The curve labelled A in FIG. 3 represents the fluid pressure in the test inflator resulting from actuation of only the first of two initiators like the initiators 18 and 20. This corresponds to the softest stage of actuation described above. Accordingly, in that stage of actuation, the fluid pressure in the storage chamber continuously decreased from the storage pressure of approximately 3,500 psig following actuation of the first initiator. The curve labelled A in FIG. 4 shows the corresponding increase in fluid pressure in the tank.

The curve labelled B in FIG. 3 represents the fluid pressure in the test inflator resulting from actuation of a first initiator at time T=0, and further resulting from actuation of a second initiator three milliseconds later. This corresponds to a stage as described above. In that stage of actuation, the heat generated by ignition and combustion of the fuel gas upon actuation of the second initiator increased the pressure in the storage chamber to a maximum level of approximately 8,800 psig at time T=17 milliseconds. The fluid pressure in the storage chamber subsequently decreased continuously as the heated inflation fluid flowed from the inflator to the tank. As indicated by the curve labelled B in FIG. 4, the sudden increase in fluid pressure in the storage chamber caused a corresponding increase in fluid pressure in the tank.

The curves labelled C, D and E in FIG. 3 similarly represent the fluid pressure in the storage chamber resulting from stages of actuation in which a first initiator is actuated at time T=0, with a second initiator being actuated 18, 33 and 47 milliseconds later, respectively. Actuation of a second initiator at each of these successively later times is thus shown to cause the fluid pressure in the storage chamber to reach maximum elevated levels at correspondingly later times, and also to reach maximum levels that tend to be lower than those attained upon earlier actuation of the second initiator. This is because the amounts of fuel gas and primary gas remaining in the storage chamber, and, therefore, the degree to which the thermal energy provided by combustion of the fuel gas can heat the inflation fluid upon actuation of the second initiator, decreases continuously following actuation of the first initiator.

The curves labelled C, D and E in FIG. 4 show the fluid pressure levels attained in the tank upon actuation of the first and second initiators in the stages indicated by the curves C, D and E in FIG. 3, respectively. The present invention thus enables the fluid pressure in an inflatable device to be controlled throughout a wide range indicated by the differing curves A–E shown in FIG. 4.

Figure 5:
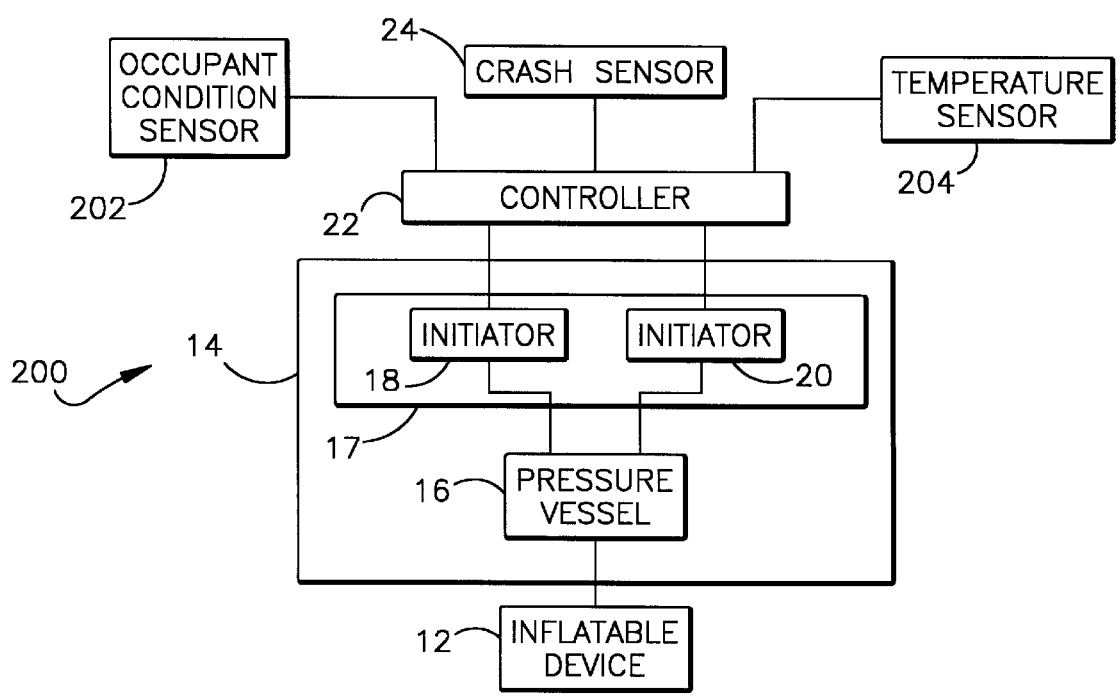
FIG. 5 is a schematic view of a vehicle occupant protection apparatus comprising a second embodiment of the present invention.

A vehicle occupant protection apparatus 200 comprising a second embodiment of the present invention is shown schematically in FIG. 5. The apparatus 200 includes an occupant condition sensor 202 and a temperature sensor 204 in addition to the crash sensor 24 of FIG. 1. The apparatus 200 is otherwise substantially the same as the apparatus 10, as indicated by the use of the same reference numbers in FIGS. 5 and 1.

The occupant condition sensor 202 may comprise any known device that provides a signal indicating a vehicle occupant condition such as, for example, an occupant's size, weight and/or position. Other vehicle occupant conditions include the occupant's presence in the vehicle and the occupant's use of a seat belt, as indicated by a seat belt buckle switch or the like. In each case, the sensor 202 provides the controller 22 with an additional deployment signal that the controller 22 uses, along with the deployment signal received from the crash sensor 24, to select a stage of actuation for the initiator assembly 17.

The temperature sensor 204 provides a deployment signal indicating the ambient temperature at the inflator 14. Since the ambient temperature at the inflator 14 can affect the pressure of the inflation fluid stored in the storage chamber 28, it can likewise affect the flow rate at which the inflation fluid exits the storage chamber 28 upon actuation of the initiators 18 and 20. The controller 22 in the second embodiment of the present invention thus selects a stage of actuation for the initiator assembly 17 with reference to the occurrence and severity of a vehicle crash, and with further reference to a condition of a vehicle occupant and/or the ambient temperature at the inflator 14. The stages of actuation selected by the controller 22 in the second embodiment of the invention preferably include all of the differing stages described above with reference to the first embodiment.

From the above description of the invention, those skilled in the art will perceive improvements, changes and modifications. For example, the deployment conditions sensed by the sensors 24, 202 and 204 are described by way of example only. Other vehicle or vehicle occupant conditions also could be used as deployment conditions for selecting an actuation stage for a plurality of initiators in accordance with the present invention. Such improvements, changes and modifications within the skill of the art are intended to be covered by the appended claims.

What is claimed is:

1. Apparatus for deploying an inflatable vehicle occupant protection device, said apparatus comprising:

a pressure vessel having a single chamber containing a stored inflation fluid;

an ignitable source of thermal energy stored in said single chamber and in contact with an inflation fluid and which, when ignited, heats said inflation fluid in said single chamber;

an initiator assembly which, when actuated, initiates an outlet flow of said inflation fluid from said single chamber;

said initiator assembly including a first actuatable device which opens said pressure vessel without igniting said thermal energy in said single chamber; said initiator assembly further including a second actuatable device which ignites said source of thermal energy to release said thermal energy to heat said inflation fluid in said single chamber; and means for actuating said initiator assembly in a selected one of a plurality of differing stages which correspond to a plurality of differing deployment conditions, said stages including a stage in which said first actuatable device is actuated and said second actuatable device is never actuated.

2. Apparatus as defined in claim 1 wherein said source of thermal energy comprises an ignitable fuel, said first actuatable device, when actuated, varying the amount of said fuel available for heating said inflation fluid.

3. Apparatus as defined in claim 2 wherein said first actuatable device, when actuated, reduces the degree to which said thermal energy can heat said inflation fluid by dissipating said fuel without heating said inflation fluid.

4. Apparatus as defined in claim 3 wherein said fuel comprises pressurized fuel gas, said first actuatable device, when actuated, opening said pressure vessel to initiate an outlet flow of said fuel gas from said pressure vessel without igniting said fuel gas.

5. Apparatus for deploying an inflatable vehicle occupant protection device, said apparatus comprising:

a closed pressure vessel having a single chamber containing inflation fluid and an ignitable fluid in contact with said inflation fluid and for, when ignited, heating said inflation fluid;

a first initiator which, when actuated, opens said pressure vessel to initiate an outlet flow of said inflation fluid and said ignitable fluid from said single chamber without heating said inflation fluid;

a second initiator which, when actuated, ignites said ignitable fluid in said single chamber to heat said inflation fluid in said single chamber; and means for actuating said first and second initiators in a selected one of a plurality of differing stages which correspond to a plurality of differing deployment conditions;

said differing stages including a stage in which said first initiator is actuated and said second initiator is never actuated.

6. Apparatus as defined in claim 5 wherein said differing stages include a stage in which said first and second initiators are actuated sequentially, and further include a stage in which said first and second initiators are actuated simultaneously.

7. Apparatus as defined in claim 6 wherein said deployment conditions comprise a plurality of vehicle conditions including a crash-indicating condition and a temperature condition.

8. Apparatus as defined in claim 6 wherein said deployment conditions comprise a plurality of differing vehicle occupant conditions.

9. Apparatus as defined in claim 6 wherein said single chamber includes a rupturable closure part, said first initiator containing pyrotechnic material and having a ram part which is movable forcefully against said closure part under the influence of combustion products emitted by said pyrotechnic material, said first initiator blocking said combustion products from entering said storage chamber.

10. Apparatus as defined in claim 9 wherein said first initiator defines a chamber in which said combustion products develop a thrust which acts against said ram part to move said ram part forcefully against said closure part, said ram part blocking said combustion products from exiting said chamber.

11. Apparatus for deploying an inflatable vehicle occupant protection device, said apparatus comprising:

a closed pressure vessel having a single chamber containing a stored inflation fluid and an ignitable material in contact with said inflation fluid and, when ignited, for heating said inflation fluid;

a first initiator which, when actuated, opens said pressure vessel to initiate an outlet flow of said inflation fluid and said ignitable material from said single chamber without heating said inflation fluid;

a second initiator which, when actuated, ignites said ignitable material in said single chamber to heat said inflation fluid in said single chamber; and means for actuating said first and second initiators in a selected one of a plurality of differing stages which correspond to a plurality of differing deployment conditions;

said differing stages including a stage in which said first initiator is actuated and said second initiator is never actuated.

12. Apparatus as defined in claim 11 wherein said pressure vessel has a storage chamber with a rupturable closure part, said first initiator containing pyrotechnic material and having a ram part which is movable forcefully against said closure part under the influence of combustion products emitted by said pyrotechnic material, said first initiator blocking said combustion products from entering said storage chamber.

13. Apparatus as defined in claim 12 wherein said first initiator defines a chamber in which said combustion products develop a thrust which acts against said ram part to move said ram part forcefully against said closure part, said ram part blocking said combustion products from exiting said chamber.

* * * * *